US008667426B2

(12) United States Patent
Matsubara et al.

(10) Patent No.: US 8,667,426 B2
(45) Date of Patent: Mar. 4, 2014

(54) INPUT APPARATUS

(75) Inventors: Takashi Matsubara, Yokohama (JP);
Mayumi Nakade, Yokohama (JP);
Tomochika Ozaki, Yokohama (JP);
Yujin Tsukada, Saitama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/523,672

(22) Filed: Jun. 14, 2012

(65) Prior Publication Data

US 2012/0249767 A1 Oct. 4, 2012

Related U.S. Application Data

(63) Continuation of application No. 12/481,739, filed on Jun. 10, 2009, now abandoned.

(30) Foreign Application Priority Data

Sep. 29, 2008 (JP) .................................. 2008-249510

(51) Int. Cl.
*H04N 7/18* (2006.01)

(52) U.S. Cl.
USPC ........... 715/863; 715/716; 715/810; 715/830; 715/973

(58) Field of Classification Search
USPC ....................... 715/716, 810, 830, 863, 973
See application file for complete search history.

(56) References Cited

U.S. PATENT DOCUMENTS

| 6,351,273 B1* | 2/2002 | Lemelson et al. ............ 715/786 |
| 6,385,331 B2* | 5/2002 | Harakawa et al. ............ 382/106 |
| 2005/0271252 A1 | 12/2005 | Yamada |
| 2007/0236475 A1* | 10/2007 | Wherry ........................ 345/173 |

FOREIGN PATENT DOCUMENTS

| JP | 2000-149025 A | 5/2000 |
| KR | 20060118195 A | 11/2006 |

OTHER PUBLICATIONS

China State Intellectual Property Office (SIPO) office action for SIPO patent application CN200910141610.2 (Jun. 29, 2011).

* cited by examiner

*Primary Examiner* — Sath V Perungavoor
*Assistant Examiner* — Jeffery Williams
(74) *Attorney, Agent, or Firm* — Kilpatrick Townsend & Stockton LLP (57) ABSTRACT

An input apparatus includes an input unit that receives a predetermined motion image signal, a motion detecting unit that detects a motion from the motion image signal received by the input unit, a video signal processing unit that outputs a predetermined video signal when a motion detected by the motion detecting unit is a predetermined motion, and a control unit that controls the video signal processing unit, in which the control unit controls the motion detecting unit not so as to detect a motion when the predetermined video signal is being outputted by the video signal processing unit, thereby providing a useful input apparatus for a user.

6 Claims, 12 Drawing Sheets

INPUT APPARATUS

INCORPORATION BY REFERENCE

This application is a continuation application of U.S. patent application Ser. No. 12/481,739, filed on Jun. 10, 2009, which claims priority from Japanese Application JP 2008-249510, filed on Sep. 29, 2008, the content of which is hereby incorporated by reference into this application.

BACKGROUND OF THE INVENTION

The present invention relates to an input apparatus for receiving a user command.

Personal computers and television sets with operable functions have been in widespread use such that a user operation is accepted through a graphical user interface (hereinafter, referred to as GUI) and an operational result is simultaneously given to the user as a feedback.

For example, JP-A-2000-149025 has disclosed a gesture recognition apparatus in which a three-dimensional coordinate of points indicating a feature of arms and legs motion of a human are measured, a three-dimensional position/posture of the human is estimated by using the feature points other than these among the extracted feature points, a user coordinate system on which each of the coordinate axes is uniquely determined in response to the user posture is constructed as the three-dimensional position of the estimated user as set to a reference point, a feature amount that is not dependent on the user position/posture is extracted by transforming the feature points of the user's arms and legs into the user coordinate system, and a gesture performed by the human is estimated by matching a time series variation that time with a gesture model.

SUMMARY OF THE INVENTION

However, when the gesture recognition apparatus disclosed in the JP-A-2000-149025 is used for an input operation of a device such as a television set, it is difficult to distinguish whether a motion image taken from a user represents an input to the device. For example, when a user's hand indicates the right direction so as to represent an input to the device and then puts back to its initial position, the motion of the hand put back to the initial position is sometimes recognized as an input motion represented by the left direction. That is, the JP-A-2000-149025 does not consider a technique for which of the motion is accepted as an input to the device when the user performs a gesture.

Further, there have been demands that a continuous input is performed on the operation of the device and software, for example, a volume control button on a remote controller is depressed continuously, and a channel switching button thereon is also depressed continuously. However, the JP-A-2000-149025 does not consider that a continuously inputted operation is performed smoothly by using a gesture command.

The invention is made in consideration of the above problem, and an object of the invention is to provide a useful input apparatus for a user, in which an operationally effective motion is pointed to a user, a feedback as a real time signal is simultaneously given to the user, and a continuously inputted motion can be performed.

According to an aspect of the invention, the input apparatus provides an input, unit that receives a predetermined motion image signal, a motion detecting unit that detects a motion from the motion image signal entered into the input unit, a video signal processing unit that outputs a predetermined video signal when a motion detected by the motion detecting unit is a predetermined motion, and a control unit that controls the video signal processing unit so as to continue outputting the predetermined video signal when a subsequent motion from the predetermined motion to be detected by the motion detecting unit is an iteration motion and moves continuously at a speed equal to or faster than a predetermined speed.

Further, the control unit controls the motion detecting unit so as not to detect the motion when the motion is not continuously moved at the speed equal to or faster than the predetermined speed, while the predetermined video signal is being outputted by the video signal processing unit.

For example, a motion where the user's hand puts back to a position prior to waving his/her hand is performed after the user waved his/her hand. However, the user's hand motion is not recognized under a condition where an animation continues and an article is being selected, for this reason, the motion where the users hand puts back to the position prior to waving his/her hand is made not to accept as a selecting operation of the article.

According to the invention, the operationally effective motion is pointed to the user, the feedback as a real time signal is simultaneously given to the user, and the continuously inputted motion can be performed, so that a useful input apparatus can be provided for the user.

The other objects, features and advantages of the invention will become apparent from the following description of the embodiments of the invention taken in conjunction with the accompanying drawings.

DESCRIPTION OF THE EMBODIMENTS

Hereinafter, embodiments of the invention will be described with reference to the drawings.

First Embodiment

Figure 1:
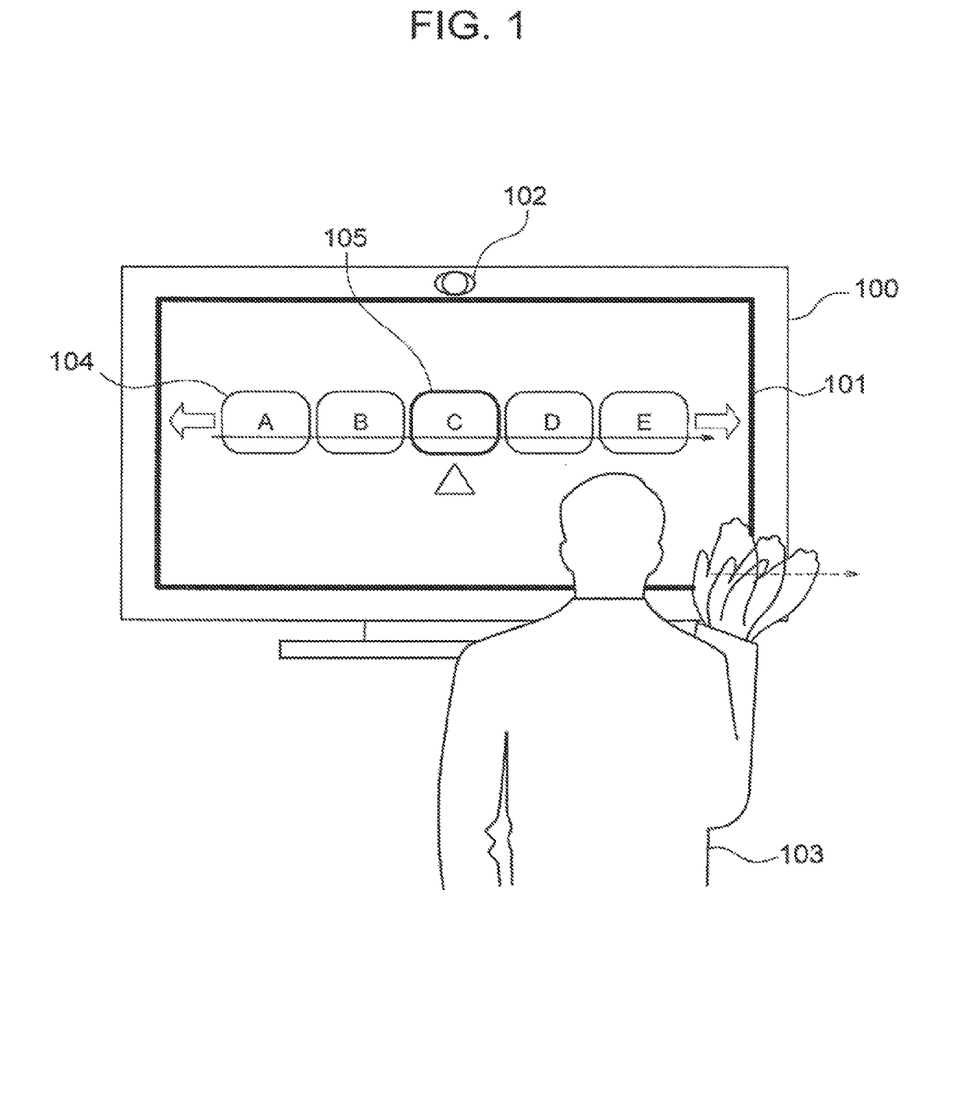
FIG. 1 is a schematic diagram showing an input apparatus in a first embodiment.

Referring to FIG. 1, an input apparatus 100 in this embodiment detects a user's hand motion from a motion image taken from a user to be able to change a display of GUI in response to the user's hand motion. FIG. 1 shows an outline of an operational environment operated by the user, and the input apparatus 100 is constituted by a display unit 101, an imaging unit 102, a user 103, a menu article 104, and a selection article 105.

The display unit 101 is constituted by a display device such as a liquid crystal display, a plasma display, etc., and also constituted by a display panel, a panel control circuit, and a panel control driver, so that a video signal constituted by data supplied from an after-mentioned video processing unit 202 can be displayed on the display panel. The imaging unit 102 is used for supplying a motion image to the input apparatus 100, such as a camera. The user 103 therefore operates the input apparatus 100. The menu article 104 is GUI displayed on the display unit 101, which is constituted by a plurality of articles. The selection article 105 is a selected condition among the menu articles 104 in response to a user operation.

Figure 2:
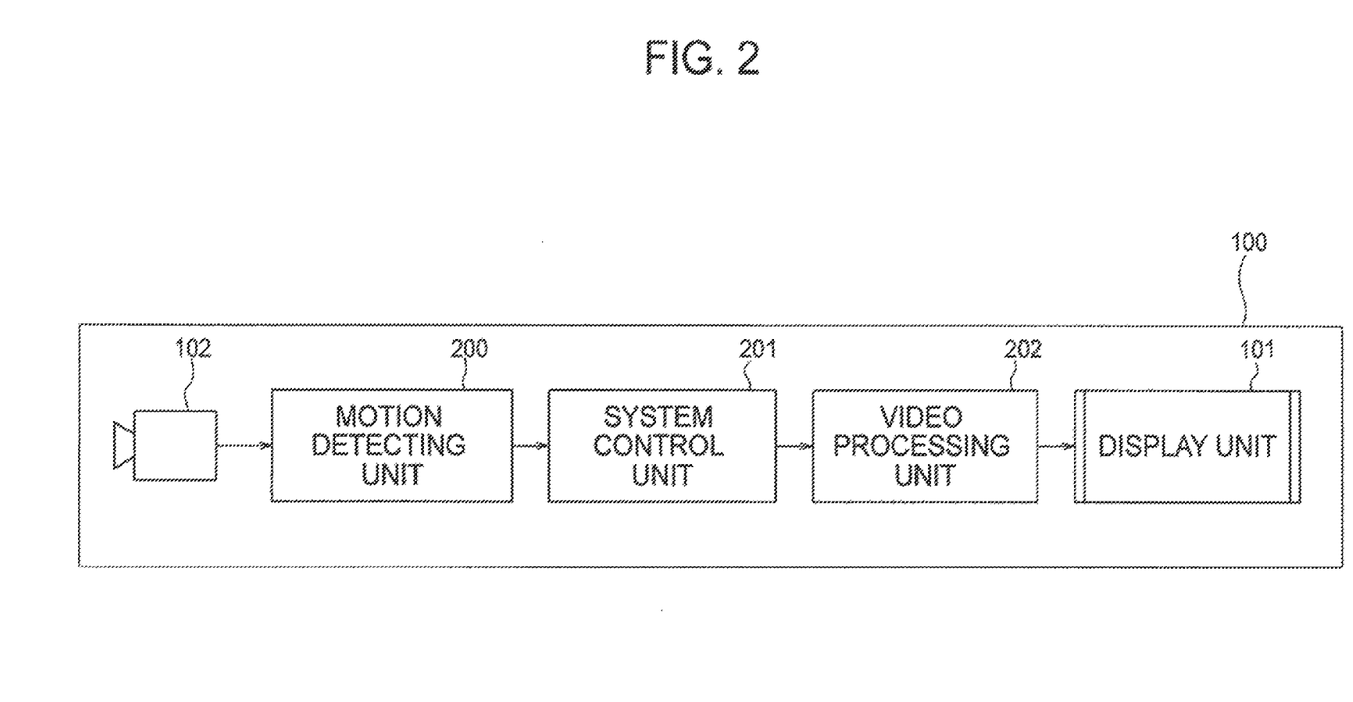
FIG. 2 is a block diagram showing a constitution of the input apparatus in the first embodiment.

Referring to FIG. 2, the input apparatus 100 provides a motion detecting unit 200, a system control unit 201, and the video processing unit 202, in addition to the display unit 101 and imaging unit 102.

The motion detecting unit 200 is a circuit to receive a motion image signal from the imaging unit 102, detect a human motion from the received motion image signal, and output the detected motion as a predetermined command.

The system control unit 201 is constituted by a microprocessor, for example, to control an operation of video processing unit 202 in response to the command received from the motion detecting unit 200.

The video processing unit 202 is constituted by a processing device such as ASIC, FPGA, MPU, etc. The video processing unit 202 transforms video data of the GUI into a form capable of processing in the display unit 101 in accordance with the control of system control unit 201 to then output from the unit 202.

Figure 3:
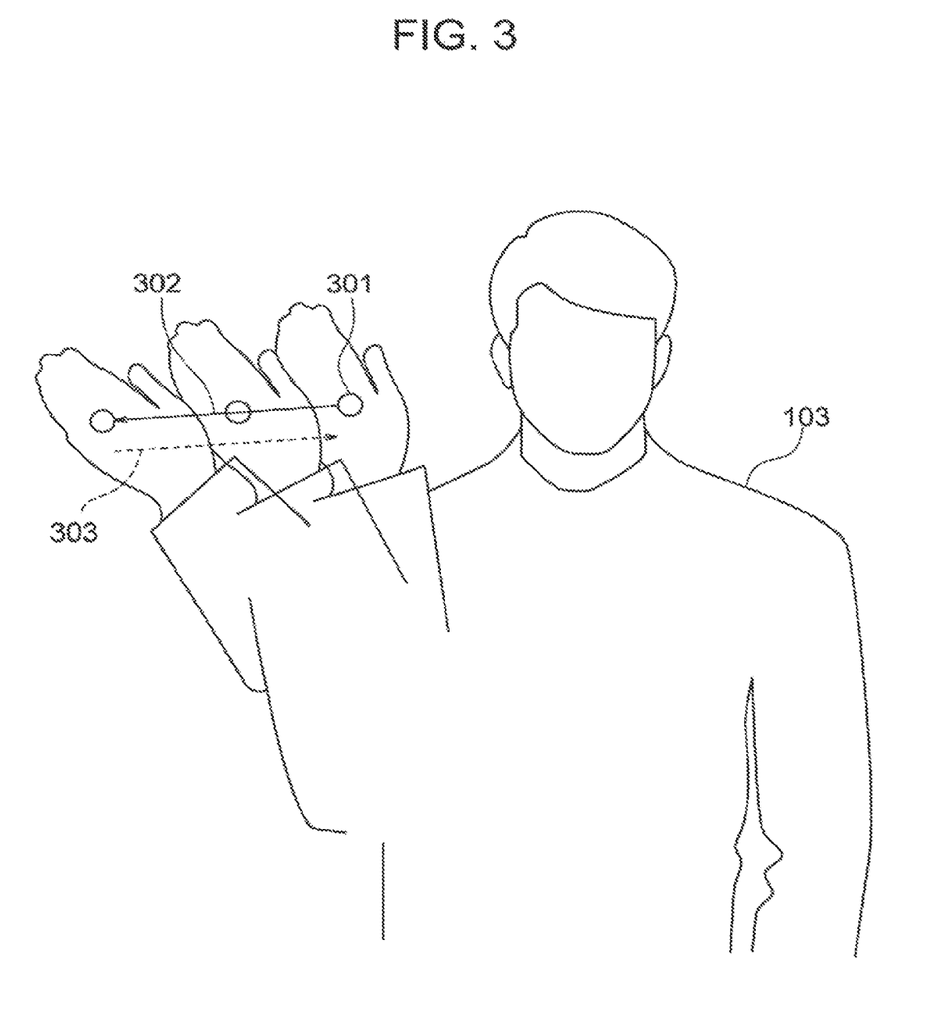
FIG. 3 is a schematic diagram showing an operation method of performing by the user using the input apparatus in the first embodiment.

FIG. 3 shows a user's hand motion when the user operates the input apparatus 100 in the invention. In the embodiment, the menu article 104 is moved in response to a direction and a speed of waving the user's hand when the user waves his hand in, the left and right directions. The user moves an arbitrary article to the position of selection article 105 in accordance with the operation of waving the user's hand in the left and right directions, thereby selecting an article. A recognition point 301 indicates the position of user's hand to be recognized by the input apparatus 100. A hand waving motion 302 indicates a waving motion of the hand for moving the menu article 104 by the user, which is a user operation to enter a signal into the input apparatus 100. Further, a hand putting back motion 303 indicates a hand putting back to an initial position prior to waving the user's hand, after waved the hand like the hand waving motion 302.

Figure 4:
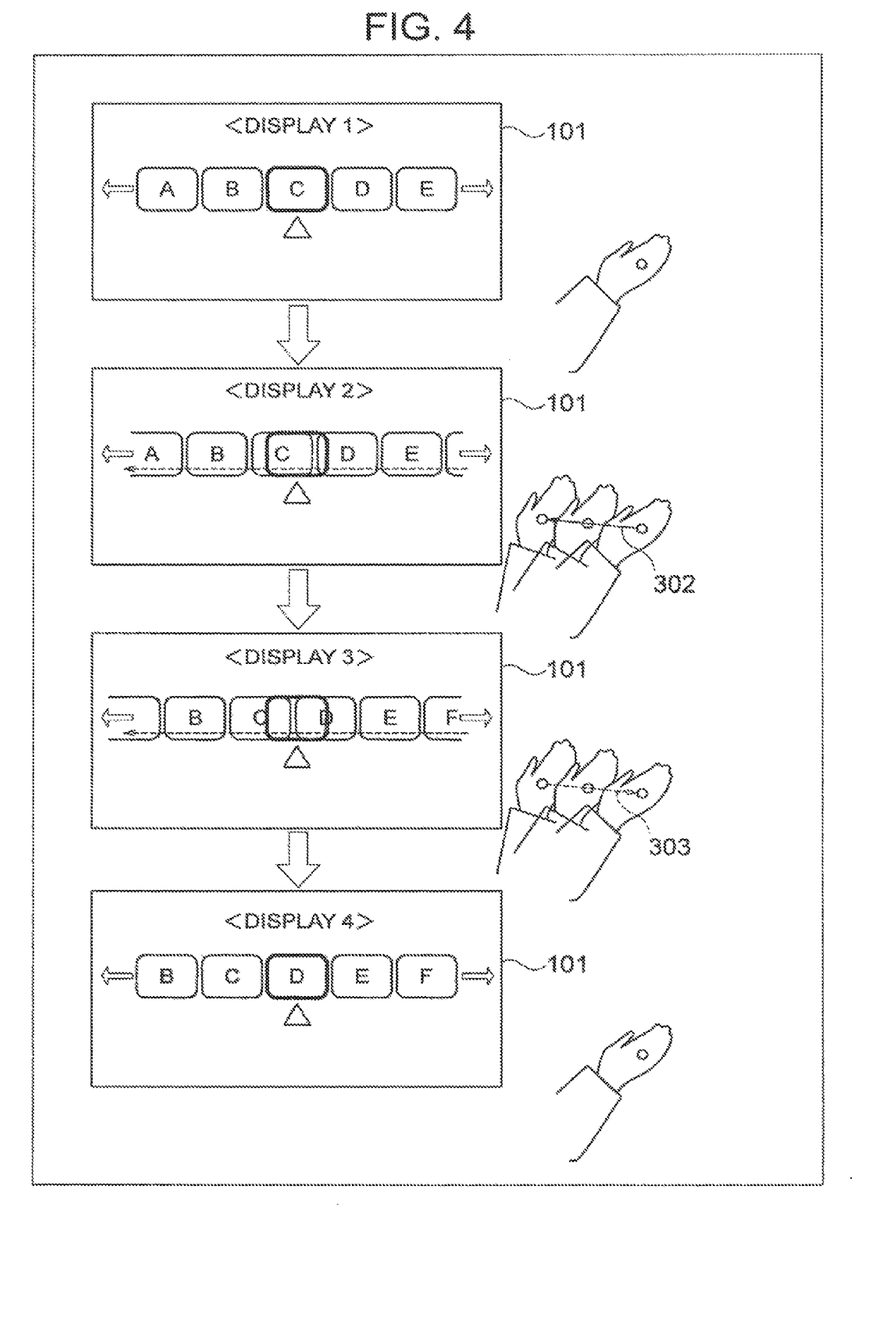
FIG. 4 is a schematic diagram for explaining a correspondence between the movement of GUI and the user operation in the first embodiment.

FIG. 4 shows the user's hand motion and a condition of the GUI displayed on the display unit 101 when the user operates the input apparatus 100.

Next, an operation of the input apparatus 100 will be described with reference to FIG. 1 to FIG. 4, and FIG. 5 showing a flowchart.

The input apparatus 100 detects the user's hand motion from the motion image signal taken from the user to be able to change the display of GUI in response to the user's hand motion.

First, the following description will be concerned with FIG. 2 showing a processing flow from when the input apparatus 100 detects the user's hand motion to when the GUI display is changed in response to the motion. Assuming that the user depresses a power source button (not shown) on the input apparatus 100 to start an operation of the input apparatus 100, the system control unit 201 responds to the operation start to then command the GUI display to the video processing unit 202. The video processing unit 202 responds to the command to output a video signal suitable to an input of the display unit 101. In this way, the GUI is displayed on the display unit 101.

Further, the system control unit 201 responds to the operation start to command a start of taking a motion image to the imaging unit 102. The imaging unit 102 responds to the command to start a take of the motion image and then output data as taken motion image to the motion detecting unit 200. The motion detecting unit 200 detects a position of the user's hand from the received motion image by using methods such as a feature point extraction to then output data of the hand position to the system control unit 201. The system control unit 201 calculates a direction and a speed of the user's hand motion from the data of the hand position to thereby command a change of the GUI display to the video processing unit 202 in accordance with a predetermined direction and in accordance with the direction and the speed if the hand motion moves at a speed equal to or faster than a predetermined speed. The video processing unit 202 responds to the command to change the data constituting the GUI and output a video signal suitable to the input of display unit 101 on the basis of the data. In this way, the GUI to be displayed on the display unit 101 is updated.

Figure 5:
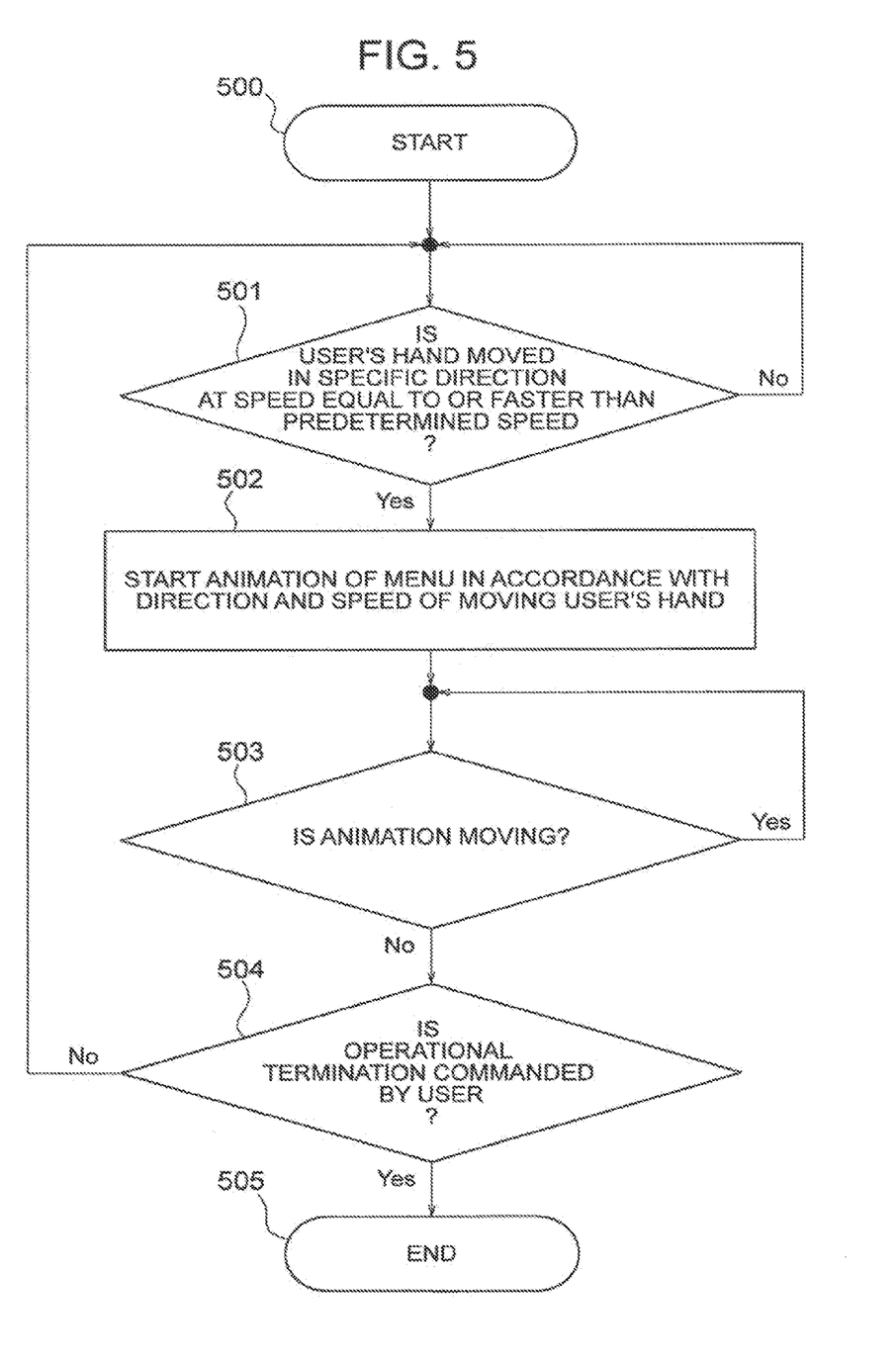
FIG. 5 is a flowchart for explaining an operation of the input apparatus in the first embodiment.

Next, the following detailed description will be concerned with reference to FIG. 4 and FIG. 5 when the input apparatus 100 accepts an input of moving the user's hand. First, the user starts an operation of the input apparatus 100 in accordance with a predetermined sequence at a step 500. An example of the user's hand and the condition of displayed on the display unit 101 at this time is shown in a display 1 of FIG. 4. When starting the operation, the input apparatus 100 starts to monitor the user's hand motion at a step 501.

If the user's hand moves in a specific direction at a speed equal to or faster than the predetermined speed at the step 501 in the case of "Yes," the input apparatus 100 starts an animation of the menu article 104 in accordance with the direction and speed of moving the user's hand, as shown in a display 2 of FIG. 4. On the other hand, if the user's hand is not moved at the speed equal to or faster than the predetermined speed at the step 501 in the case of "No," the input apparatus 100 continues monitoring the user's hand motion. Next, the input apparatus 100 monitors, at a step 503 in the case of "Yes," a continuous condition of the animation movement that has been started at a step 502.

Here, the animation is constituted such that it moves on the menu article 104 by taking a predetermined time period. The input apparatus 100 does not monitor the user's hand motion on moving the animation. In this way, even when the user performs the hand putting back motion 303 on moving the animation, as shown in a display 3 of FIG. 4, the motion is not reflected on the movement of the menu article 104, and the operation in accordance with the hand waving motion 302 is reflected.

If the movement of animation is terminated at the step 503 in the case of "No," the input apparatus 100 confirms whether the user commands an operational termination. If the operation continues at a step 504 in the case of "No," the user's hand motion is monitored once again. The user's hand and the condition of GUI displayed on the display unit 101 at this time are shown in a display 4. That is, the user's hand position becomes a position prior to performing the hand waving motion 302 and the menu article 104 becomes a condition where another article is selected in accordance with the direction of moving the user's hand. Therefore, the user can start again the operation for the menu article 104. Further, when the user commands the operational termination at the step 504 in the case of "Yes," the input apparatus 100 terminates the operation such as the monitor of the user's hand motion at a step 505.

In this way, the input apparatus 100 recognizes the direction and speed of moving the user's hand to animate the menu article 104 in response to the direction and speed, but does not recognize the user's hand motion while the animation is being moved. In this way, the user can put back his hand to the initial position without recognizing the hand putting back motion 303 after indicating a hand waving direction, so that the operation such as selection of the menu article can be performed continuously and smoothly by a simple operation such as only hand waving motion.

In this embodiment, the motion detecting unit 200 is constituted such that the motion detection is not performed when a predetermined video signal is outputted by the video processing unit 202. However, the motion detecting unit 200 may be controlled such that it does not perform the motion detection when a control unit measures a time period during which a predetermined video signal is outputted by the video processing unit 202 and this time period does not exceed a predetermined value.

Figure 6:
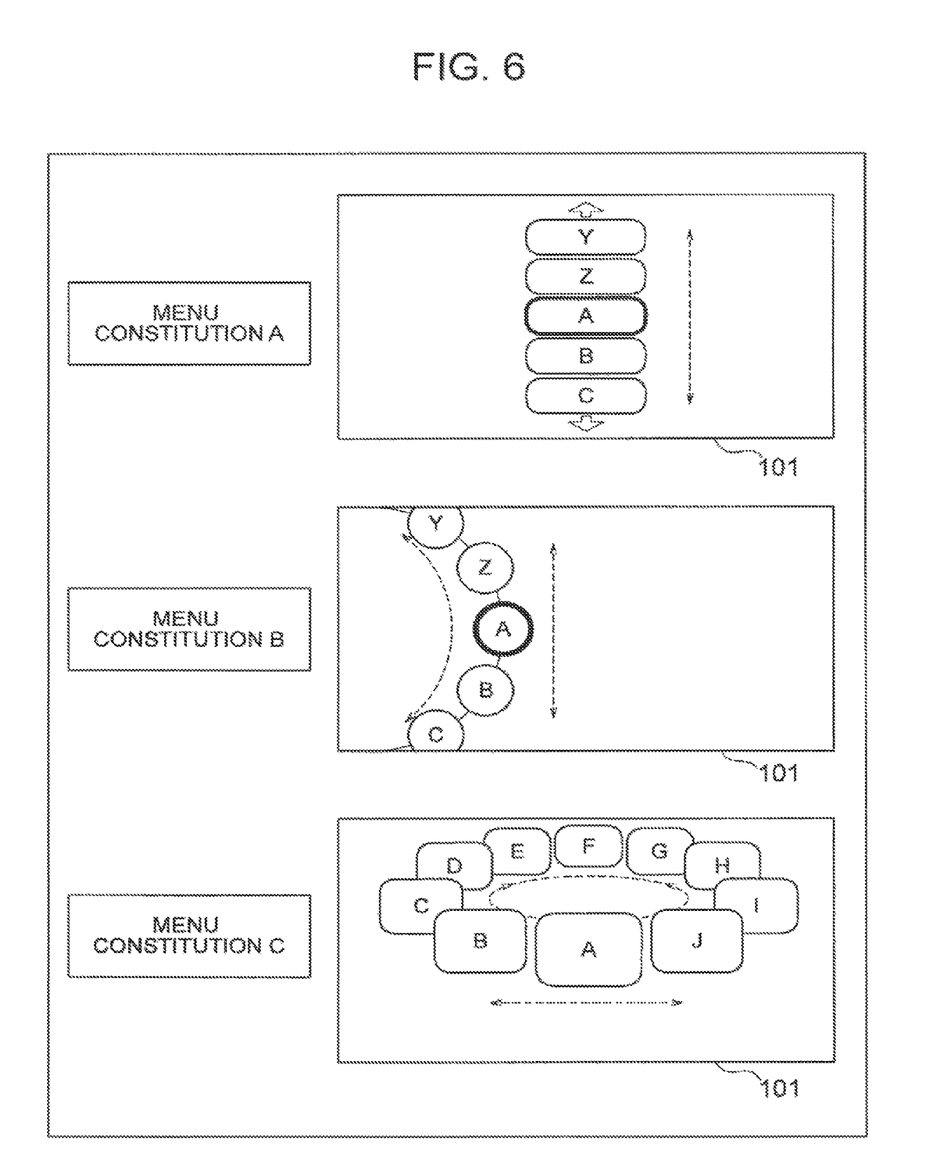
FIG. 6 is a schematic diagram showing a constitution of GUI in the first embodiment.

In addition, the GUI displayed on the display unit 101 may be constituted by a menu constitution A and a menu constitution B both operable by the user's hand waving up and down motion and a menu constitution C operable by the user's hand waving left and right motion.

Second Embodiment

Next, the following description will be concerned with a second embodiment. In this embodiment, in addition to the operation method that has been described with the input, apparatus 100 in the first embodiment, another operation method will be described with use of the operation of the menu article in also the case where the user's hand waves at a speed equal to or slower than the predetermined speed. The constitution of the input apparatus 100 and that of the GUI displayed on the display unit 101 are the same as these in the first embodiment, but the recognition method is different in that of the user's hand waving motion.

Hereinafter, the second embodiment will be described with reference to the drawings. Further, the reference numerals in the drawings of the first embodiment are labeled as the same constitutional elements to the drawings in the second embodiment, and its description is omitted for avoiding duplication.

Figure 7:
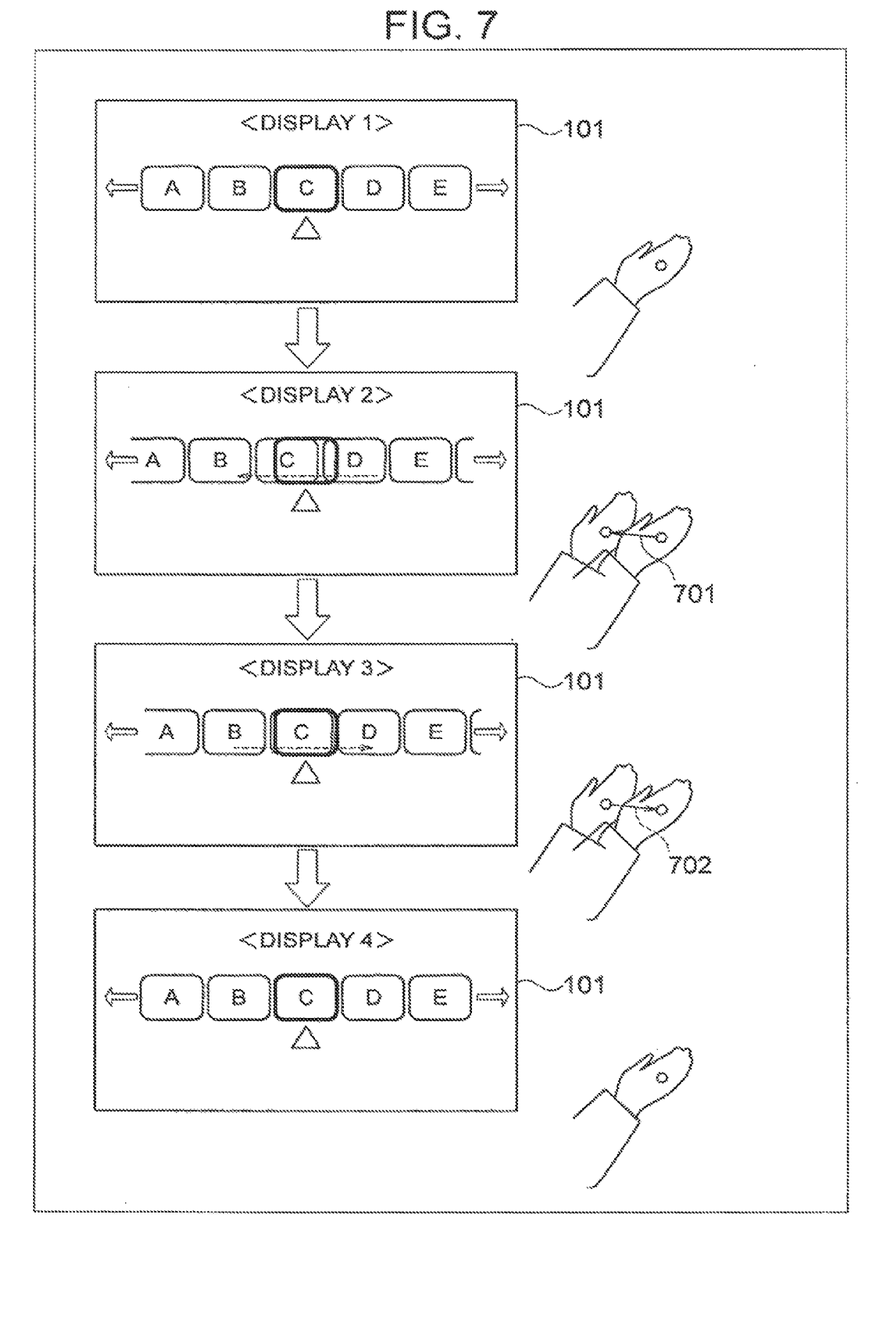
FIG. 7 is a schematic diagram for explaining the correspondence between the movement of GUI and the user operation in a second embodiment.

FIG. 7 shows the user's hand and the condition of GUI displayed on the display unit 101 when the user operates the input apparatus 100 in this embodiment. The user's hand motions 701, 702 show his hand motion when the user moves his hand slowly at a speed equal to or slower than the predetermined speed in the after-mentioned operation of the input apparatus 100.

Figure 8:
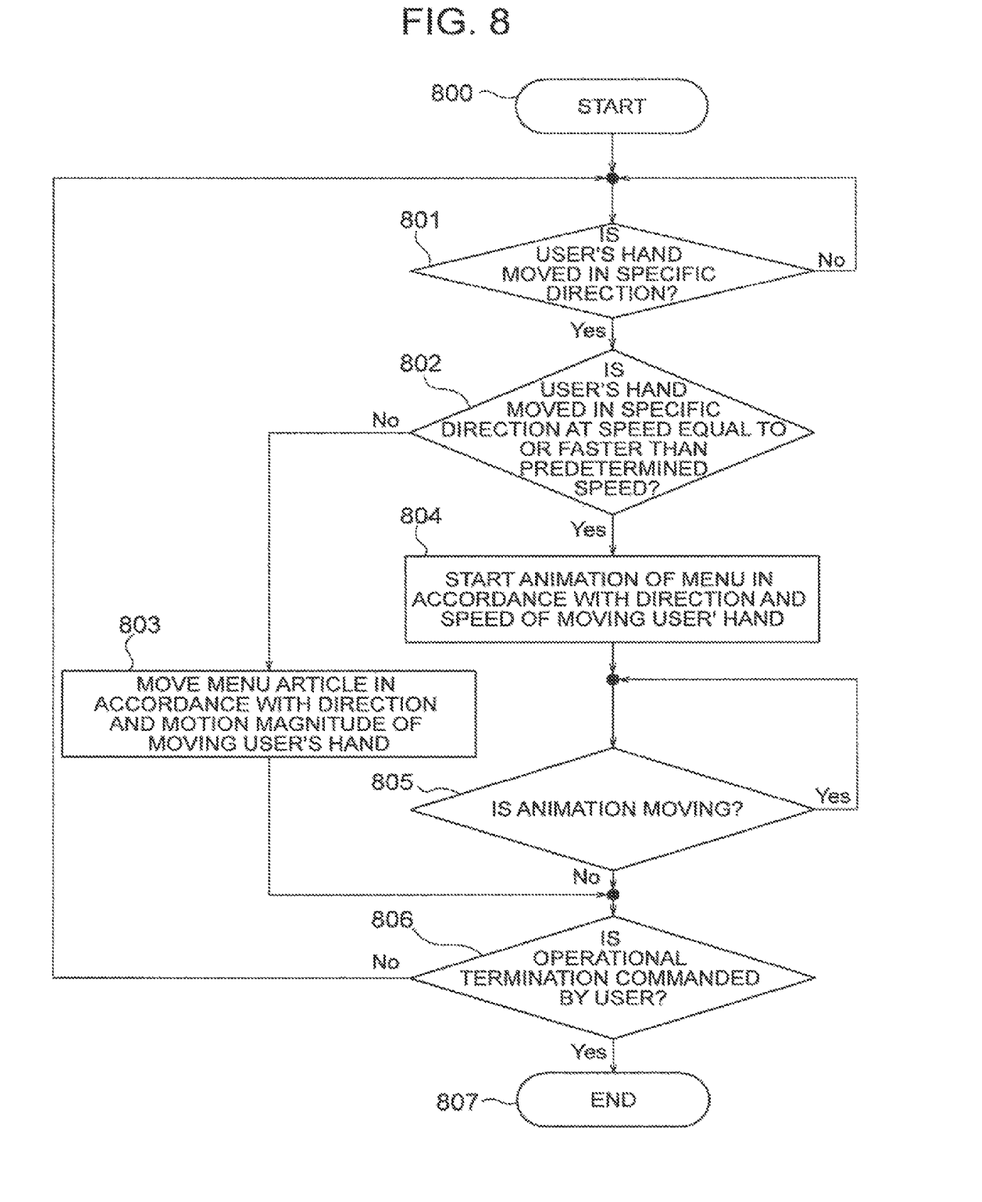
FIG. 8 is a flowchart for explaining an operation of the input apparatus in the second embodiment.

An operation of the input apparatus 100 in this embodiment will be described with reference FIG. 7 and FIG. 8 showing a flowchart.

First, the user starts the operation of the input apparatus 100 in accordance with a predetermined sequence at a step 800. An example of the user's hand and the condition of GUI displayed on the display unit 101 at this time is shown in a display 1 of FIG. 7. When starting the operation, the input apparatus 100 starts to monitor the user's hand motion at a step 801. A speed of the user's hand motion is calculated at a step 802 if the user's hand moves in a specific direction at the step 801 in the case of "Yes."

At this time, if the speed of user's hand motion is not equal to or faster than the predetermined speed at the step 802 in the case of "No," by following the direction where the user moves his hand as shown in a display 2 and a display 3 of FIG. 7, the menu article 104 is moved in accordance with the direction of moving the user's hand and a magnitude of its movement, at a step 803. On the other hand, if the user's hand moves at a speed equal to or faster than the predetermined speed at the step 802, the following steps 804 to 807 are the same as the steps 502 to 505 described in FIG. 5 of the first embodiment.

In this way, the input apparatus 100 recognizes the direction and speed of moving the user's hand and moves the menu article 104 in accordance with the direction of the user's hand motion and its magnitude, when the user's hand moves at the speed equal to or slower than the predetermined speed. The input apparatus 100 also starts the animation of the menu article 104 in response to the direction and speed of moving the user's hand and does not recognize the user's hand motion while the animation is being moved, when the user's hand moves at the speed equal to or faster than the predetermined speed.

In this way, the user can know that the users' hand motion himself is recognized in accuracy by the input apparatus 100, with a small hand motion and a slowly moved hand motion. Further, the user can also know whether the change of the selection article 105 in the menu article 104 is performed by how much speed of the user's hand motion is required by the user, so that the user can easily know the operation method and the operation condition of the input apparatus 100, and can operate more intuitively.

Third Embodiment

Next, the following description will be concerned with a third embodiment. In this embodiment, in addition to the operation method described with the input apparatus 100 in the first embodiment, an operation method of continuously operating the movement of animation will be described, regardless of the user's hand waving direction, when the animation of menu article 104 starts by the user's hand motion and the user continuously moves his hand while the animation is being moved. The constitution of the input apparatus 100 and that of the GUI displayed on the display unit 101 are the same as these described in the first embodiment, but the recognition method is different in that of the user's hand waving motion.

Hereinafter, the third embodiment will be described with reference to the drawings. Further, the reference numerals in the drawings of the first embodiment are labeled as the same constitutional elements to the drawings in the third embodiment, and its description is omitted for avoiding duplication.

Figure 9:
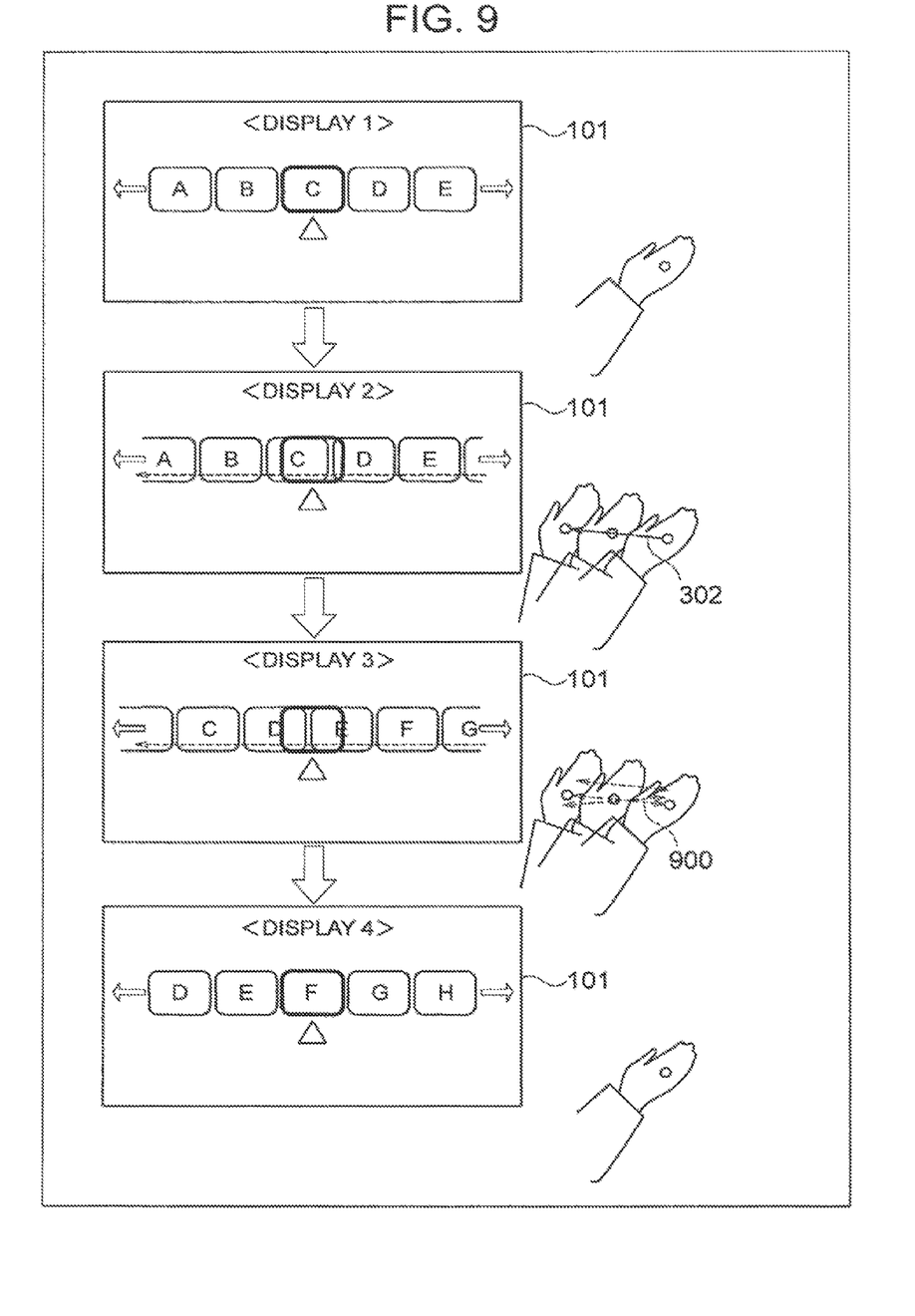
FIG. 9 is a schematic diagram for explaining a correspondence between the movement of GUI and the user operation in a third embodiment.

FIG. 9 shows the user's hand and the condition of GUI displayed on the display unit 101 when the user operates the input apparatus 100 in this embodiment. A user's hand motion 900 shows his hand motion when the user continuously waves his hand, after the animation of menu article 104 has started by the user's hand waving motion in a display 2 of FIG. 9.

Figure 10:
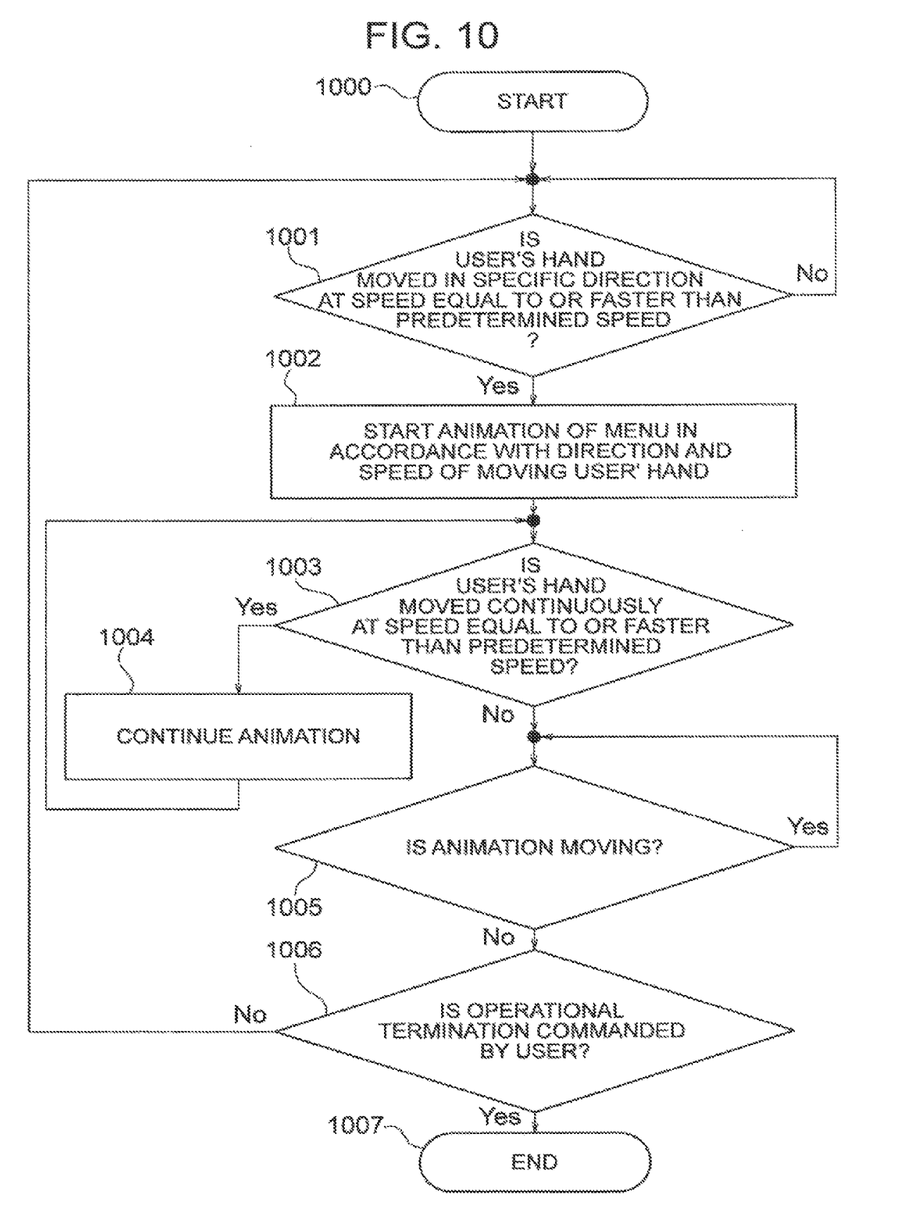
FIG. 10 is a flowchart for explaining an operation of the input apparatus in the third embodiment.

An operation of the input apparatus 100 in this embodiment will be described, with reference to FIG. 9 and FIG. 10 showing a flowchart.

First, the user starts the operation of input apparatus 100 in accordance with a predetermined sequence at a step 1000. An example of the user's hand and the condition of GUI displayed on the display unit 101 is shown in a display 1 of FIG. 9. When starting the operation, the input apparatus 100 starts to monitor the user's hand motion at a step 1001. If the user's hand moves in a specific direction at a speed equal to or faster than the predetermined speed at the step 1001 in the case of "Yes," the input apparatus 100 starts the animation of menu article 104 in accordance with the direction and speed of moving the user's hand at a step 1002, as shown in the display 2 of FIG. 9.

Further, the input apparatus 100 continues monitoring the user's hand motion at a step 1003. If the user's hand continuously moves at the speed equal to or faster than the predetermined speed at the step 1003 in the case of "Yes," the input apparatus 100 continues the animation, regardless of the direction of the user's hand motion, at a step 1004. At this time, the animation is moved so as to select a continuously next article in accordance with the first recognized hand motion when the selection article 105 in the menu article 104 starts as animation, as shown in a display 3 of FIG. 9. On the other hand, if the user's hand does not continuously move at the speed equal to or faster than the predetermined speed at the step 1003, the following steps 1005 to 1007 are the same as the steps 503 to described in FIG. 5 of the first embodiment.

In this way, the input apparatus 100 recognizes the direction and speed of moving the user's hand and starts animation in the menu article 104 in response to the direction and speed of moving the user's hand, when the user's hand moves at the speed equal to or faster than the predetermined speed. Subsequently, when the user's hand continuously moves at the speed equal to or faster than the predetermined speed, the menu article 104 continues animating in the same direction to thereby move such that the selection article 105 is changed one after another.

In this way, first, the user waves his hand in a direction toward which the menu article moves when selecting a continuous menu article, thereafter, selects the articles one after another by only waving his hand continuously, regardless of the hand waving direction. Therefore, the selection of the continuous menu article can be performed more smoothly.

Fourth Embodiment

Next, the following description will be concerned with a fourth embodiment. In this embodiment, an input apparatus for realizing an operation method equivalent to that of the first embodiment will be described with the case where the input apparatus 100 in the first embodiment can receive data from a pointing device such as a mouse, a touch pad, etc., and a sensor device such as an acceleration sensor etc.

Figure 11:
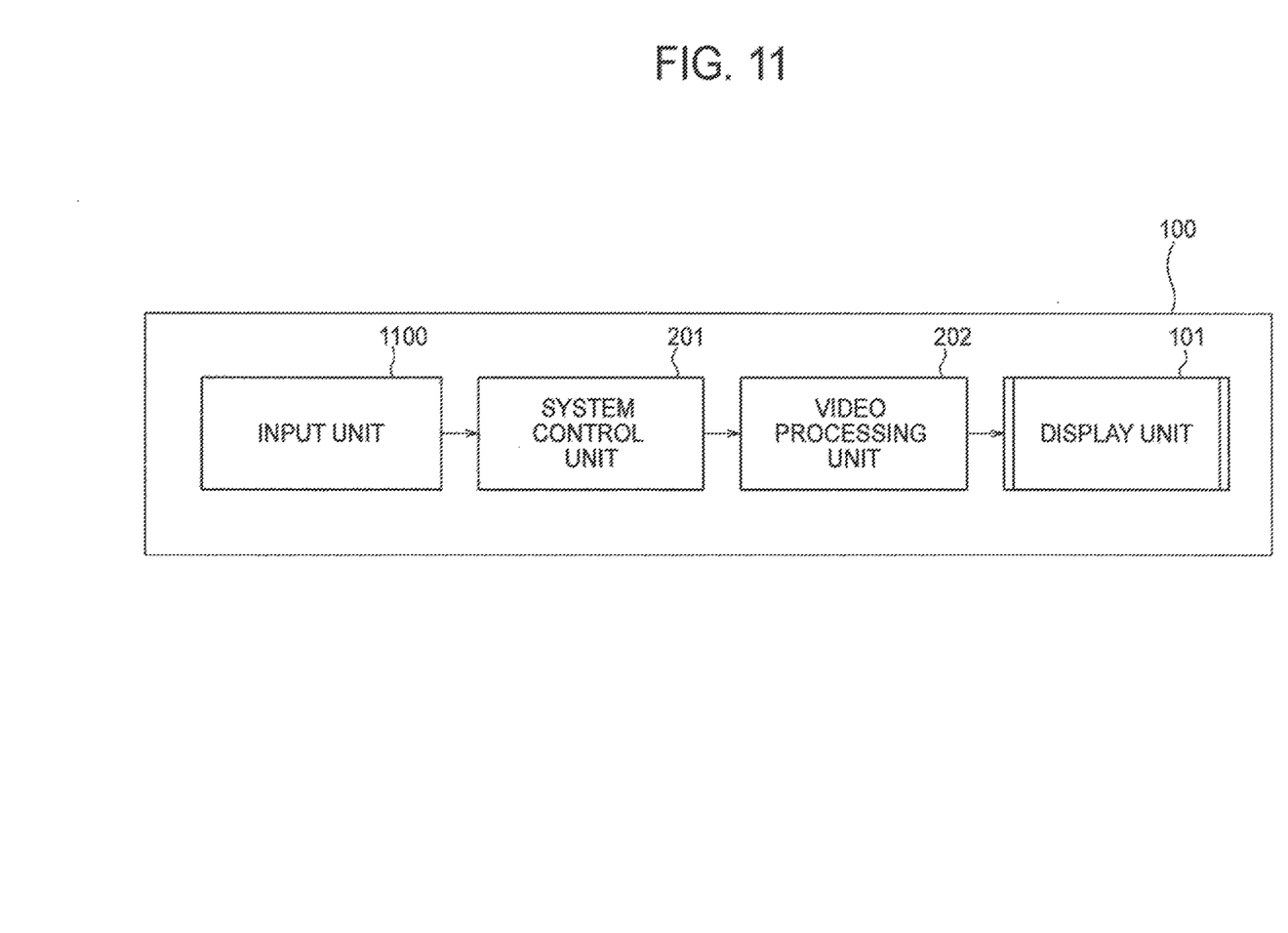
FIG. 11 is a block diagram showing a constitution of the input apparatus in a fourth embodiment.

Hereinafter, the fourth embodiment will be described with reference to the drawings. Further, the reference numerals in the drawings of the first embodiment are labeled as the same constitutional elements to the drawings in the fourth embodiment, and its description is omitted for avoiding duplication. The input apparatus 100 in the fourth embodiment is constituted such that it can receive data from the pointing device such as the mouse, the touch pad, etc., and the sensor device such as the acceleration sensor etc. to therefore enter motion information (pointing information and direction indicated information) into the system control unit 201 from an input unit 1100, as shown in FIG. 11.

Figure 12:
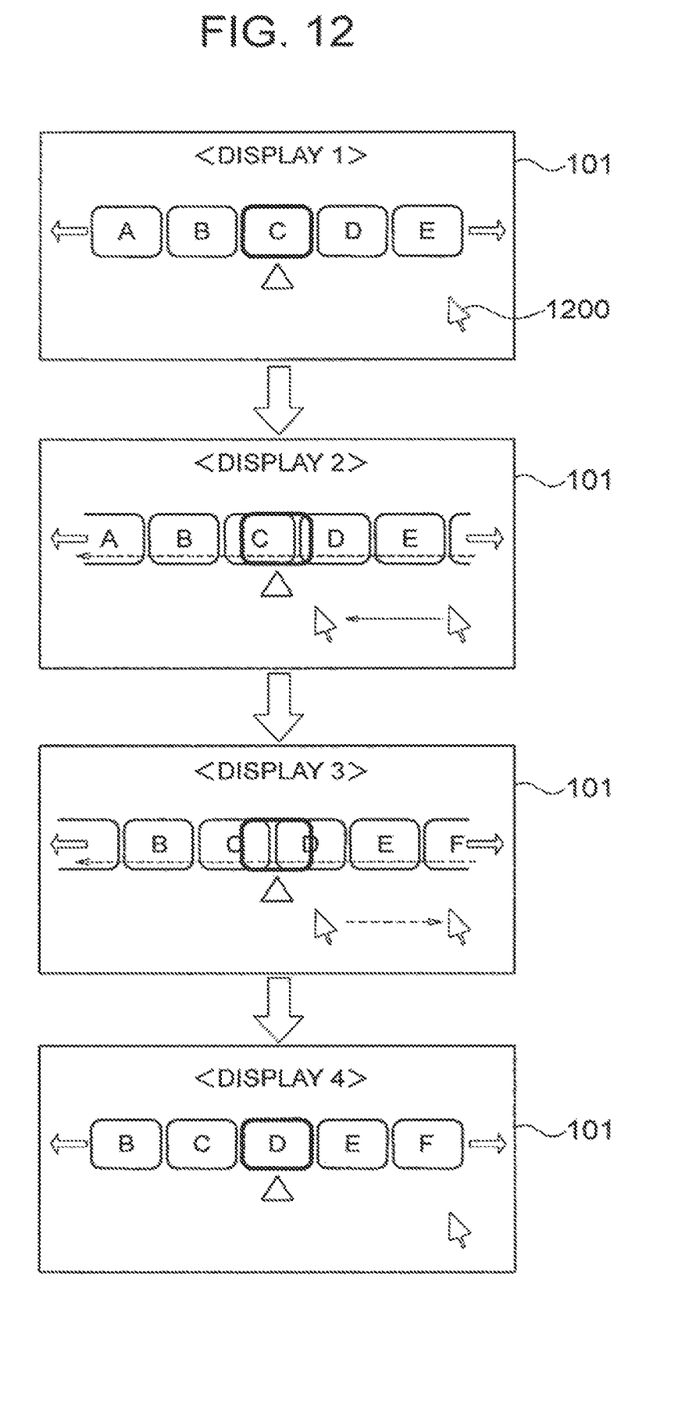
FIG. 12 is a schematic diagram for explaining a correspondence between the movement of GUI and a pointer operation in the fourth embodiment.

Further, FIG. 12 shows a condition of an input result obtained from the input unit 1100 and the condition of GUI displayed on the display unit 101 when the user operates the input apparatus 100 in this embodiment. A cursor 1200 indicates a specific coordinate position on a display screen on the basis of the input result. In this embodiment, the motion of cursor 1200 is handled equivalent to the user's hand motion in the first embodiment, so that the user can operate similar to the first embodiment. In the case where the input unit 1100 is constituted by the sensor device such as the acceleration sensor etc., output information from the sensor device is handled equivalent to information of the user's hand motion in the first embodiment without displaying the cursor 1200 on the display unit 101, so that the user can operate similar to the first embodiment.

In this way, in the input apparatus 100 in this embodiment, even when the input apparatus 100 does not have an input unit such as the imaging unit 102, the user can perform smoothly the operation for selecting the menu article by the same method described in the first embodiment without using a delicate operation such as the existing pointing operation, but, only entering a large motion in the specific direction into the input unit 1100.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for inputting an operation in a display apparatus in which a menu in a screen is operated in accordance with a motion of a user, comprising the steps of:
    receiving a hand motion of the user as motion information; and
    displaying a display of moving an animation constituting the menu in accordance with the received motion information;
    wherein the displaying step comprising:
    a first step that, when the animation remains still, the hand motion is recognized and the display of moving the animation is displayed in accordance with the recognized hand motion;
    a second step that, while the animation is moving in the first step, the hand motion is not recognized, and the display of moving the animation is continued to be displayed; and
    a third step that, when the animation is stopped in the second step, the hand motion is newly recognized, and the display of moving the animation is displayed in accordance with the newly recognized hand motion.

2. The method according to claim 1, wherein in the displaying step, when the animation constituting the menu remains still and the motion information indicates a motion in a specific direction at a speed equal to or faster than a predetermined speed, a display of moving the animation constituting the menu is displayed in accordance with the specific direction and speed.

3. The method according to claim 1, wherein the animation constituting the menu is an animation of a plurality of selection articles constituting a menu.

4. A method for inputting an operation in a display apparatus in which a menu in a screen is operated in accordance with a hand motion of a user, comprising the steps of:

receiving a hand motion of the user as an image signal;
detecting a motion from the received image signal; and
displaying a display of moving an animation constituting the menu in accordance with the detected motion;
wherein the displaying step comprising:
a first step that, when the animation remains still, the motion is detected and the display of moving the animation is displayed in accordance with the detected motion;
a second step that, while the animation is moving in the first step, the motion is not detected, and the display of moving the animation is continued to be displayed; and
a third step that, when the animation is stopped in the second step, the motion is newly detected, and the display of moving the animation is displayed in accordance with the newly detected motion.

5. The method according to claim 4, wherein when the animation constituting the menu remains still and the detected motion is a hand motion in a specific direction at a speed equal to or faster than a predetermined speed in the detecting step, a display of moving the animation constituting the menu is displayed in accordance with the specific direction and the speed in the displaying step.

6. The method according to claim 4, wherein the animation constituting the menu is an animation of a plurality of selection articles constituting a menu.

* * * * *